C. P. GRONBERG.
Improvement in Harvester-Rakes.
No. 130,295.   Patented Aug. 6, 1872.
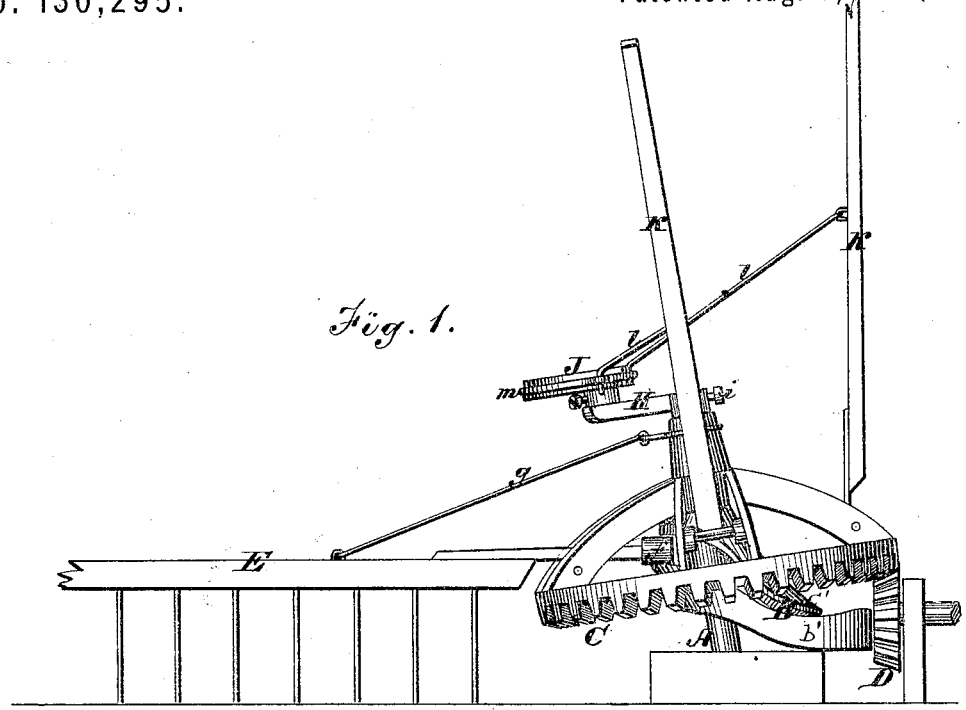
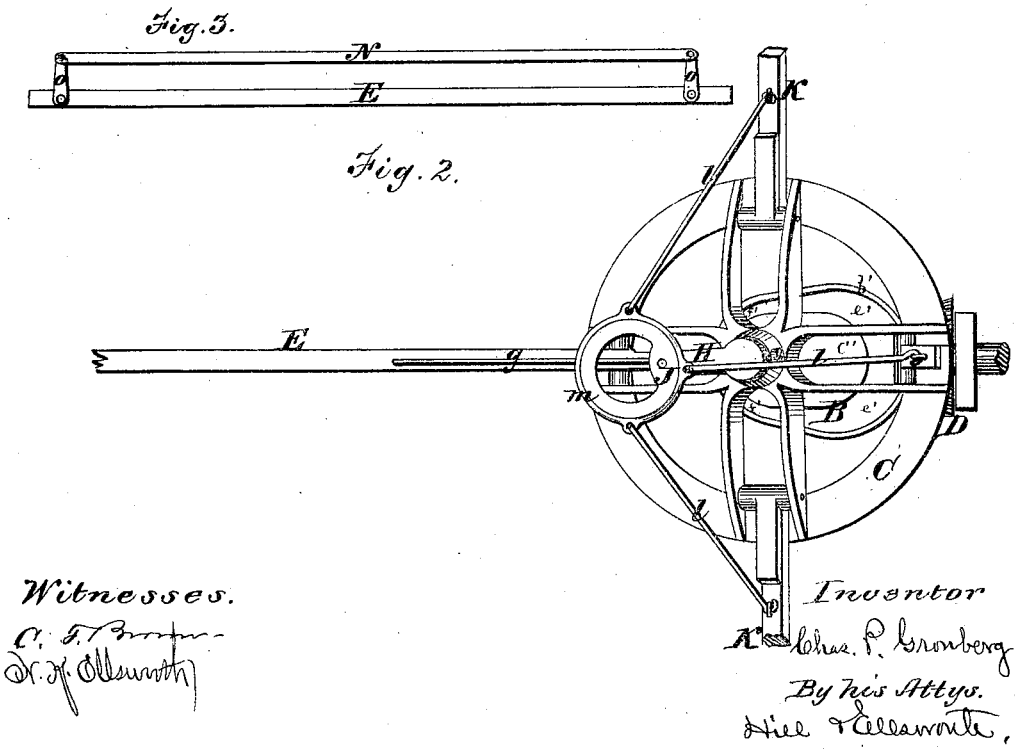
Witnesses.   Inventor
  Chas. P. Gronberg.
  By his Attys.

UNITED STATES PATENT OFFICE.

CHARLES P. GRONBERG, OF ELGIN, ILLINOIS.

IMPROVEMENT IN HARVESTER-RAKES.

Specification forming part of Letters Patent No. 130,295, dated August 6, 1872.

*To all whom it may concern:*

Be it known that I, CHARLES P. GRONBERG, of Elgin, in the county of Kane and State of Illinois, have invented a new and useful Improvement in Harvester-Rakes; and I do hereby declare the following to be a full, clear, and exact description of the same, reference being had to the accompanying drawing forming part of this specification, in which—

Figure 1 is a perspective view, showing my improved rake in position for operation. Fig. 2 is a top-plan view of the same; and Fig. 3 is a view of one of the reel-arms removed from the head.

Similar letters of reference in the accompanying drawing indicate the same parts.

My invention has for its object to improve the construction and operation of that class of harvester-rakes in which a rake and a series of reel-arms or beaters revolve around a common center. To this end the invention consists, first, in the peculiar construction of a cam-guide, by which a rising-and-falling movement is imparted to the rake, as hereinafter described. It consists, secondly, in connecting the reel-arms to an adjustable eccentric and crank-arm mounted upon the center post for the purpose of regulating the rise and fall of the arms, the point at which they shall enter the grain, and the depth to which they shall fall in gathering the same to the cutters.

In the accompanying drawing, A is an inclined center post arranged upon the frame of a harvester at or near the inner angle of the platform, and B is the cam mounted upon the center post beneath a large dish-shaped face or crown-wheel, C, and partly surrounded by it. The face-wheel is driven by a pinion, D, engaging its cogs, and which may be operated in any suitable manner from the driving-wheels of the machine. The cam is constructed in two oblong parts, the lower and larger one $b'$ inclining upward along its edges, and the upper part $c'$ beveled at its edges to correspond with such inclination. By this construction, when the two parts are placed together upon the center post a groove is formed between them, the lower portion $e'$ thereof being vertical and the inner and upper portion $f'$ horizontal. E is the rake, pivoted within an opening in the face-wheel, so that the friction-roller $f$ upon its short arm shall enter the groove of the cam. When the face-wheel is revolved the lower portion $e'$ of the groove holds and guides the rake in an upright position past the driver's seat, while the portion $f'$ guides it in a horizontal position over the platform. By constructing the cam as above described and arranging it upon the center post within, or partly within, the face-wheel, I am enabled to use a straight-armed rake within the cam-groove, which shall drop gradually into a horizontal position clear of the standing grain when it sweeps over the platform to form and deposit a gavel, and to be carried into an upright position in order to clear the latter as it leaves the platform. To prevent the rake from falling suddenly as it is lowered toward the platform, and thereby catching the standing grain or injuring its own connections with the operating mechanism, I connect it to the boss of the face-wheel by a spring or an elastic cord, $g$, as shown. The tension of the cord or spring exerted against the weight of the rake causes the latter to drop gradually without shocks or strains, and at the proper moment. The peculiar form of the cam-groove would cause the short arm of the rake to bind therein or be rapidly worn away by friction, were it not for the provision of the friction-roller $f$, as above described, which causes the arm to move freely and steadily along the irregular surfaces of the groove. H is a crank-arm adjustably connected by a set-screw, $i$, to the top of the center post, and provided with an adjustable eccentric, J, upon the end which extends toward the platform. K are the reel-arms or beaters pivoted or hinged to the face-wheel at suitable distances apart and connected by rods $l$ to a ring, $m$, fitting loosely within a groove formed in the periphery of the eccentric. When the reel-arms are put in motion by the rotation of the face-wheel the ring moves freely around the eccentric, causing the reel-arms to rise and fall alternately—that is to say, falling gradually as they reel the grain down to the cutters, and rising to an upright position after they have passed to the rear of the latter. The point at which the reel-arms shall enter the grain, and the depth to which they shall fall in gathering the same against the cutters, is regulated accurately and expeditiously by adjusting the eccentric upon the crank-arm and the latter upon the center post. N are slats connected to each reel-arm and parallel thereto by means of the pivoted links o, so that they can be turned above the arm when operating in tall grain, and below the arm in gathering short grain to the cutters.

Having thus described my invention, what I claim as new, and desire to secure by Letters Patent, is—

1. The combination of the post A, the dish-shaped crown-wheel turning loosely thereon, the straight-armed rake pivoted within the crown-wheel, and the grooved cam B, constructed as described and placed on the post, to project within the crown-wheel above the plane of its cogs, substantially as herein set forth, for the purpose specified.

2. The crank-arm H, provided with the adjustable eccentric J, to regulate the movements of the reel-arms, substantially as described, for the purpose specified.

CHARLES P. GRONBERG.

Witnesses:
 JOHN G. KRIBS,
 D. W. NORRIS.